July 25, 1967 W. A. HUTHMANN 3,333,197

RADIO FREQUENCY TRANSMISSION SYSTEM EMPLOYING MATCHED
TRANSMITTER OUTPUT RECEIVER INPUT CHARACTERISTICS
Filed Oct. 21, 1963

INVENTOR.
WOLFGANG ANDRÉ HUTHMANN
BY
Curtis, Morris + Safford

United States Patent Office 3,333,197

Patented July 25, 1967

3,333,197

RADIO FREQUENCY TRANSMISSION SYSTEM EMPLOYING MATCHED TRANSMITTER OUTPUT/RECEIVER INPUT CHARACTERISTICS

Wolfgang André Huthmann, 28 Graf-Bernadotte Str., Essen, Germany

Filed Oct. 21, 1963, Ser. No. 317,431
Claims priority, application Germany, Oct. 26, 1962, H 47,242, H 47,243; Sept. 2, 1963, H 50,165
9 Claims. (Cl. 325—26)

The present invention relates to radio frequency transmission system, more particularly the invention relates to radio telephone systems.

It is an object of the invention to substantially increase the power output of the transmitter and the sensitivity of the receiver by improving the transmitter output circuit as well as the receiver input circuit in order to achieve an improved overall efficiency of the transmission and of the reception.

It is a further object of the invention to provide a transmitter output circuit and a receiver input circuit either with an asymmetric or with a symmetric resonance circuit.

Another object of the invention is to provide an improved input amplifier circuit arrangement for the receiver.

A further object of the invention is to provide a transmitter receiver set operable and tunable in the frequency range of 100 mc. to 1000 mc.

The above objects have been achieved in accordance with the invention by providing in the transmitter output circuit and in the receiver input circuit of a radio frequency transmitter receiver set, each a tunable resonance circuit in the form of a coaxial cable. These resonance circuits are in resonance with the respective transmitting and receiving frequency and therefore a very small attenuation is obtained at this frequency.

In order to achieve the above improved conditions for transmission in a frequency range rather than at a single frequency, the coaxial cables are provided as tunable resonance circuits to thereby, in accordance with the invention, change the resonance frequency within said frequency range.

According to the invention it is possible to form the tunable resonance circuit either as an asymmetric circuit in which case the respective resonance circuits are inductively coupled to the transmitter output circuit and to the receiver input circuit, or to form said tunable resonance circuit as a symmetric circuit in which case the respective resonance circuits are directly connected to the transmitter output circuit and to the receiver input circuit.

According to the invention there is further provided an input amplifier for a radio frequency receiver, particularly for a receiver of a mobile radio telephone system operable in the range of 100 mc. to 1000 mc., said input amplifier comprising a high vacuum triode (Nuvistor) arranged in a grounded grid circuit and to the anode of which said coaxial cable is connected.

In a known receiver input amplifier the high vacuum triode, such as a Nuvistor, is arranged in the usual grounded cathode circuit which is connected to the antenna by means of a coaxial cable and which is followed by a transistor in a cascade arrangement. Due to the use of a transistor and due to the arrangement of the known circuit its application is limited to an undesirably low upper frequency.

The receiver input amplifier arranged in a grounded grid circuit has the advantage that the grounded grid provides a decoupling between the input and output of the amplifier. Moreover the input and output voltages of the grounded grid amplifier circuit are in phase with each other. A further advantage is seen in the fact that the grounded grid circuit has a substantially improved input impedance at higher frequencies, particularly above 200 mc. as compared with conventional circuits. It is for this reason that it is possible to operate the input amplifier circuit according to the invention with good efficiency up to a frequency of 1000 mc.

The present receiver input amplifier circuit is particularly suitable for mobile radio telephone systems since it is desirable to operate such systems at higher frequencies in order to avoid interference with other radio frequency transmissions operating at lower frequencies. Moreover, since it is desirable to keep the cost of radio telephone sets, particularly the cost of such portable sets, as low as possible, it is not feasible to increase the transmitting field strength to a level as high as necessary. Therefore, it is of particular advantage to employ a high vacuum triode (Nuvistor) which is capable of amplifying sufficiently above the noise level the low receiver input voltages resulting from low transmitting field strengths.

The sensitivity of receiver input amplifiers can be increased still further by providing the coaxial cable coupled to the input of the receiver input amplifier in form of a tunable resonance circuit. The coaxial cable operating at resonance has a very low attenuation at the respective receiving frequency. By making the coaxial cable a tunable resonance circuit it is possible to achieve a wide operational frequency range, for example from 100 mc. to 1000 mc.

The resonance circuits can be connected to the antennas by means of any type of transmission lines. In portable radio telephone sets such transmission lines may be omitted. In that instance the transmitter output circuit and the receiver input circuit are connected to their respective antenna directly by the coaxial cables forming said tunable resonance circuits.

The tuning of the resonance circuits can be accomplished by means of a series trimmer capacitor and a shunt trimmer capacitor. It is, however, also possible to employ several trimmer capacitors in series and/or in parallel.

It has been found that for the frequency range of 100 mc. to 1000 mc. a coaxial cable having a characteristic impedance of 52 ohms is quite suitable. The series trimmer capacitor has a capacity of 20 $\mu\mu$f. and the shunt trimmer capacitor has a capacity of 10 $\mu\mu$f.

By means of the high transmitter output power and the high receiver sensitivity achieved according to the invention, it has become possible to build the transmitter with three tubes whereby the total number of elements and hence the weight of the device is small, a feature which is particularly important in connection with portable sets.

A further advantage of the invention is seen in the possibility to operate in a frequency range covering an entire order of magnitude (100 mc. to 1000 mc.) since this permits to tune the transmitter receiver set to a multitude of different frequencies.

The embodiment of the invention which utilizes symmetric resonance circuits has the additional advantage that power consuming coupling inductances are avoided. Moreover, the symmetric arrangement has a minimum of reactances and where a symmetric antenna is employed antenna counterbalancing means are not necessary.

It is also possible to provide in each of the two series branches of the symmetric resonance circuit a testing terminal for connecting thereto a standing wave measuring bridge, for measuring in a simple manner the optimal matching of the circuit to the antenna.

It is also possible to provide the output circuit of the transmitter as well as the input amplifier of the receiver with coaxial double-disk-triodes or tetrodes or pentodes. This allows for a very compact design since the entire stage can be built as an integral unit.

Embodiments of the invention are described below with reference to the accompanying drawings wherein.

Figure 1A:
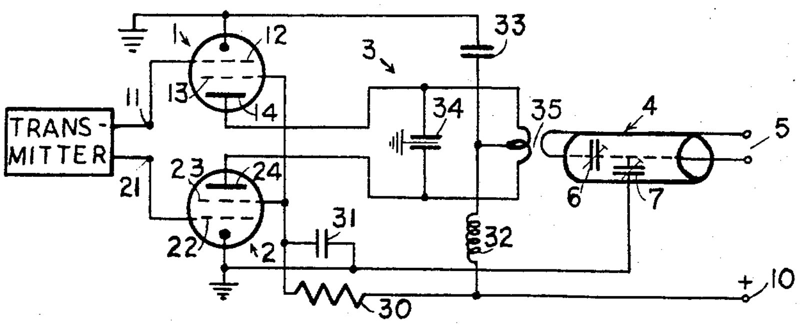
FIG. 1A shows a radio frequency transmitter circuit comprising an asymmetric resonance circuit in a coaxial cable of its output circuit.

In the drawings there are shown in detail the transmitter output circuits and the receiver input circuits. Stages preceding such output and input circuits, are of conventional design and are represented by blocks labeled Transmitter and Receiver.

FIG. 1A illustrates a transmitter output amplifier stage comprising tubes 1 and 2 connected in a push-pull circuit. Control grids 12 and 22 of these tubes are connected to the preceding transmitter stage, as at 11 and 21. Tubes of the types QQE02/5 or QQE04/5 are particularly suitable for the present purpose.

Plates 14 and 24 of the push-pull amplifier are connected in a plate circuit comprising a differential capacitor 34 and an inductance coil 35 forming a plate circuit 3 which is coupled through coil 35 to one end of a length of coaxial cable 4. Coaxial cable 4 comprises an asymmetric filter network made up of series trimmer capacitor 6 and shunt trimmer capacitor 7. The other end of coaxial cable 4 is connected to transmitter output terminals 5 which in turn are connected to an antenna (not shown).

The length of coaxial cable has preferably an attenuation of 6.7 db/328.08 ft. and an outer diameter of 0.40 inch. By means of the trimmer capacitors it is possible to vary the resonance frequency of the coaxial line within a wide range.

Screen grids 13 and 23 of tubes 1 and 2 are connected through screen grid resistor 30 to the terminal 10 which in turn is connected to a D.C. power supply source (not shown). Plate circuit 3, is also connected to the D.C. power supply source through coil 32. Capacitors 31 and 33 provide for the screen grid circuit and for the anode circuit, respectively, an A.C. path to ground.

Capacitors 6 and 7 of the tunable transmitter output resonance circuit represent an asymmetric filter network.

Figure 1B:
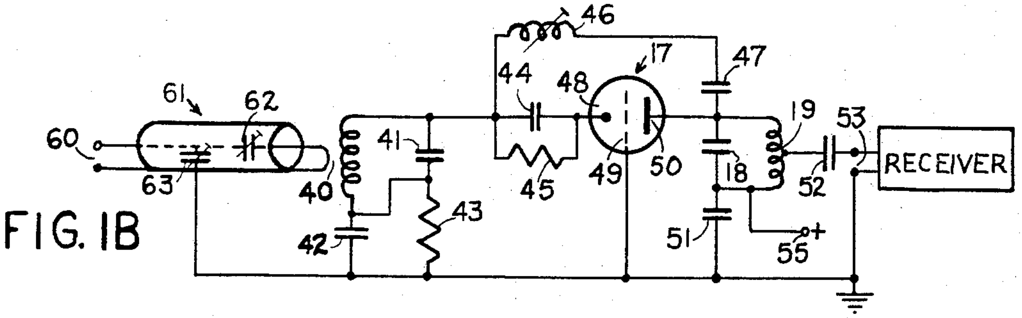
FIG. 1B illustrates a radio frequency receiver circuit having an asymmetric resonance circuit in a coaxial cable of its input circuit and showing a receiver input amplifier arranged in a grounded grid circuit.

FIG. 1B shows a receiver input amplifier stage comprising input terminals 60 connecting a receiver antenna (not shown) to a length of coaxial cable or line 61 which is formed as a receiver input resonance circuit which is tunable by means of series trimmer capacitor 62 and shunt trimmer capacitor 63. Coaxial cable 61 is inductively coupled to a circuit comprising coil 40 connected in parallel with capacitor 41. One terminal of this parallel circuit is grounded by means of capacitor 42 and resistor 43.

The other terminal of the parallel circuit is coupled to a receiver input amplifier by means of capacitor 44 and resistor 45 connected in parallel in the cathode circuit of a tube 17 having a cathode 48, a control grid 49 and an anode 50. Tube 17 is a high vacuum triode, preferably a Nuvistor of the type 7586 which is connected in a grounded grid circuit wherein grid 49 is connected directly to ground. Cathode 48 forms the input and anode 50 the output of this grounded grid circuit. A series connection of a tunable inductance coil 46 and a capacitor 47 is connected between anode 50 and the juncture of capacitors 41, 44, coil 40 and resistor 45.

The output of the grounded grid circuit comprises a capacitor 18 and a coil 19 forming a resonance circuit and connected with one jucture to cathode 50. The other juncture of this resonance circuit is grounded through capacitor 51 and connected to a D.C. power supply through terminal 55.

Further stages of the receiver are coupled, as at 53, to the output resonance circuit of the grounded grid amplifier circuit by means of capacitor 52.

Figure 2A:
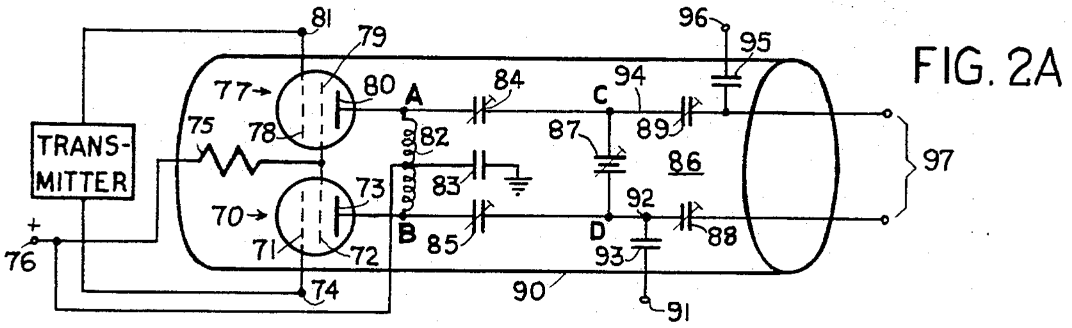
FIG. 2A shows a radio frequency transmitter circuit having a symmetric resonance circuit in a coaxial cable of its output circuit.

FIG. 2A illustrates another embodiment of a transmitter output amplifier stage according to the invention. The output amplifier comprises tubes 70 and 77 operating as a push-pull amplifier. Control grids 71 and 78 are connected through terminals 74 and 81 to the preceding stage of the transmitter, said preceding stage feeding the radio frequency to the ouptut amplifier.

Screen grids 72 and 79 are connected through resistor 75 to D.C. supply terminal 76. The cathodes (not shown) of the push-pull amplifier are connected to ground. Plates 73 and 80 are connected to the D.C. power supply through coil 82 a tap of which is connected with terminal 76. Capacitor 83 provides a ground connection for the plate circuit.

Tubes 70 and 77 are coupled through trimmer capacitors 84 and 85 to symmetric coaxial double cable 86 arranged to form a resonance circuit comprising series trimmer capacitors 88 and 89, one in each conductor 92 and 94 of the coaxial double cable, and differential trimmer capacitor 87 connected across conductors 92 and 94.

If the resonance circuit formed by the inductivities of conductors 92, 94 of the cable and by capacitors 87, 88 and 89, is tuned to the operating frequency harmonic waves are not radiated due to the fact that the coaxial cable is completely screened. Such complete screening is achieved by extending cover 90 of the coaxial cable in such a manner that it surrounds tubes 70 and 77.

Probe terminals 91 and 96 are coupled to the conductors of the coaxial cable by means of capacitors 93 and 95. Thus, it is possible to connect a standing wave measuring bridge to the coaxial cable.

The coupling of the radio frequency plate voltage to the resonance circuit is to be accomplished in the current maximum or in the voltage minimum. In order to achieve this the alternating plate voltage is coupled to the resonance circuit at points A and B as shown in FIG. 2A where the length of the double coaxial cable is equal to ¼ of the wavelength ($\lambda/4$). On the other hand, if the length of coaxial cable is equal to ½ of the wavelength ($\lambda/2$) then the alternating plate voltage is coupled to the resonance circuit at points C and D.

The circuit of FIG. 2A incorporates in an integral unit the output stage resonance circuit, a harmonic wave filter as well as a side band filter, a standing wave probe and means for adjusting the symmetry of the filter network.

The transmitter resonance circuit is connected to an antenna (not shown), through output terminals 97.

Figure 2B:
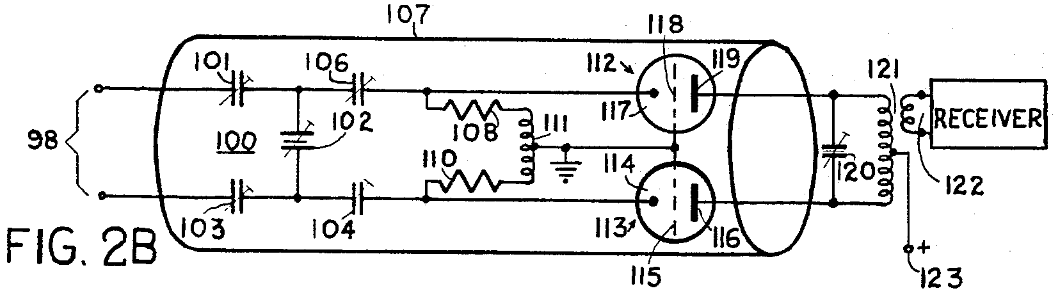
FIG. 2B illustrates a radio frequency receiver circuit having a symmetric resonance circuit in a coaxial cable of its input circuit.

FIG. 2B illustrates another embodiment of a receiver input amplifier according to the invention. Input terminals 98 of the receiver are connected to symmetric coaxial double cable 100 comprising differential shunt capacitor 102 and series trimmer capacitors 101 and 103 forming a tunable resonance circuit coupled to cathodes 114 and 117 of tubes 112 and 113 by means of further trimmer capacitors 104 and 106.

Tubes 112 and 113 are arranged in grounded grid circuits cooperating as push-pull amplifier grids 115 and 118 of which are connected directly to ground. The cathode circuit of tubes 112 and 113 connects cathodes 114 and 117 through resistors 108 and 110 and through common coil 111 to ground. D.C. power is supplied to anodes 116 and 119 through coil 121 a tap of which is connected to D.C. terminal 123.

Coil 121 forming with shunt trimmer capacitor 120 the output of the receiver input amplifier, is inductively coupled to input 122 of the following stages in the receiver. Cover 107 of coaxial cable 100 is extended to surround tubes 112 and 113.

Since the coaxial cables which are arranged to form tunable resonance circuits, are identical with each other in the transmitter and the receiver it is possible to build the output stage of the transmitter to be identical to the input stage of the receiver. Thus it is possible to provide a radio frequency transmitter and receiver set wherein but one input-output stage is provided which can be switched to perform as receiver input stage and alternately as transmitter output stage. In such a set the receiving frequency and the transmitting frequency would, of course, be equal to each other.

It is to be understood that the present invention is not limited to the particular embodiments described and shown but that it also comprises any modification within the scope of the appended claims.

What is claimed is:

1. In a radio frequency transmission system including a radio frequency transmitter having an output amplifier connected to output terminals, and a radio frequency receiver having an input amplifier connected to input terminals, the improvement comprising:

(a) a tunable transmitter output resonant circuit,
(b) a transmitter coaxial cable having a predetermined length and being adapted for coupling said output resonant circuit to the output terminals of the transmitter,
(c) a tunable recevier input resonant circuit,
(d) a receiver coaxial cable having said predetermined length and being adapted for coupling said input resonant circuit to the input terminals of the receiver,
(e) adjustable tuning means located inside said transmitter coaxial cable, and inside said receiver coaxial cable, and
(f) said transmitter coaxial cable with its output resonant circuit and said receiver coaxial cable with its input resonant circuit each having an impedance, whereby each impedance is the electrical equivalent of the respective other impedance.

2. The radio frequency transmission system according to claim 1, for a radio frequency range of 100 mc. to 1000 mc., wherein the adjustable tuning means comprise:

(a) series trimmer capacitor means each having a capacity of 20 $\mu\mu$f., and
(b) shunt trimmer capacitor means each having a capacity of 10 $\mu\mu$f.

3. The radio frequency transmission system according to claim 1, wherein each of said predetermined length of coaxial cable has a characteristic impedance of 52 ohms.

4. The radio frequency transmission system according to claim 2, wherein said series trimmer and shunt trimmer capacitor means in each resonant circuit are electrically interconnected to form a symmetric filter network.

5. The radio frequency transmission system according to claim 4, wherein each of said coaxial cables of said predetermined length comprises a coaxial twin conductor cable.

6. The radio frequency transmission system according to claim 4, wherein the symmetric filter network forms an I-configuration having two horizontal members connected with each other by a vertical member, each horizontal member having two series filter network branches each with a trimmer capacitor therein, said vertical member forming a shunt branch of the filter network and having a trimmer capacitor in such shunt branch.

7. The radio frequency transmission system according to claim 6, wherein said series filter network branches comprise test terminals for connecting to such test terminals a standing wave measuring bridge.

8. In a radio frequency transmission system including a radio frequency transmitter having an output amplifier connected to output terminals, and a radio frequency receiver having an input amplifier connected to input terminals, the improvement comprising:

(a) a tunable transmitter output resonant circuit,
(b) a transmitter coaxial cable having a predetermined length and being adapted for coupling said output resonant circuit to the output terminals of the transmitter,
(c) a tunable receiver input resonant circuit,
(d) a receiver coaxial cable having said predetermined length and being adapted for coupling said input resonant circuit to the input terminals of the receiver,
(e) adjustable tuning means located inside said transmitter coaxial cable, and inside said receiver coaxial cable,
(f) said transmitter coaxial cable with its output resonant circuit and said receiver coaxial cable with its input resonant circuit each having an impedance, whereby each impedance is the electrical equivalent of the respective other impedance, and
(g) said receiver input amplifier comprising a high vacuum triode tube connected in a grounded grid configuration.

9. The radio frequency transmission system according to claim 8, wherein said high vacuum triode tube is of the metal ceramic type 7586.

References Cited

UNITED STATES PATENTS

| | | | |
|---|---|---|---|
| 2,109,843 | 3/1938 | Kassner | 325—138 |
| 2,149,387 | 3/1939 | Brown | 325—127 X |
| 2,235,010 | 3/1941 | Chaffee | 325—129 X |
| 2,253,381 | 8/1941 | Lee | 325—178 X |
| 2,259,510 | 10/1941 | Alford | 343—862 X |
| 2,406,364 | 8/1946 | Friis et al. | 331—101 |
| 2,751,499 | 6/1956 | Glass | 331—101 X |
| 2,781,512 | 2/1957 | Robinson | 343—862 X |

JOHN W. CALDWELL, *Acting Primary Examiner.*